United States Patent [19]

Muller-Feuga

[11] 4,205,625
[45] Jun. 3, 1980

[54] BREEDING CHAMBER FOR MARINE ANIMALS, ESPECIALLY FOR FISH, AND DEEP WATER BREEDING FARM WITH AT LEAST ONE SUCH CHAMBER

[75] Inventor: Arnaud Muller-Feuga, Clichy, France

[73] Assignee: Agence Nationale de Valorisation de la Recherche (ANVAR), Neuilly-sur-Seine, France

[21] Appl. No.: 906,589

[22] Filed: May 16, 1978

[30] Foreign Application Priority Data

May 18, 1977 [FR] France ................. 77 15220

[51] Int. Cl.$^2$ ............... A01K 61/00; A01K 63/00
[52] U.S. Cl. .................................... 112/2; 119/3
[58] Field of Search ................... 119/3, 2, 4

[56] References Cited

U.S. PATENT DOCUMENTS

| | | | |
|---|---|---|---|
| 3,499,421 | 3/1970 | MacDonald et al. | 119/2 |
| 3,709,195 | 1/1973 | Tabb | 119/2 |

Primary Examiner—Hugh R. Chamblee
Attorney, Agent, or Firm—Brisebois & Kruger

[57] ABSTRACT

A chamber for breeding and raising marine animals such as fish. The chamber is usable particularly in open water and is composed of a flexible film of plastic material which is inert with respect to a marine environment. The arrangement includes a pump for introducing water under a pressure greater than the surrounding environment into the chamber, and discharge openings through which the water discharges. A farm for raising marine animals can include at least one such chamber connected to a support spar, in the water, and extending vertically. Torus shaped water inflatable rims can be used to maintain the shape of a chamber.

15 Claims, 12 Drawing Figures

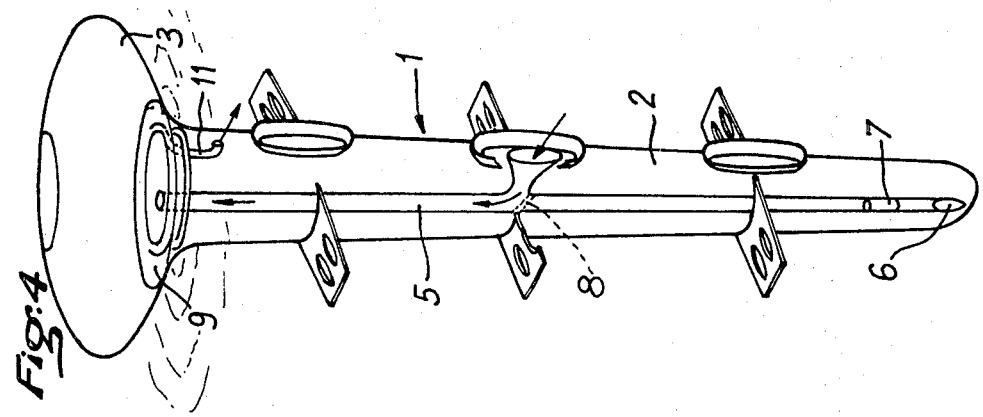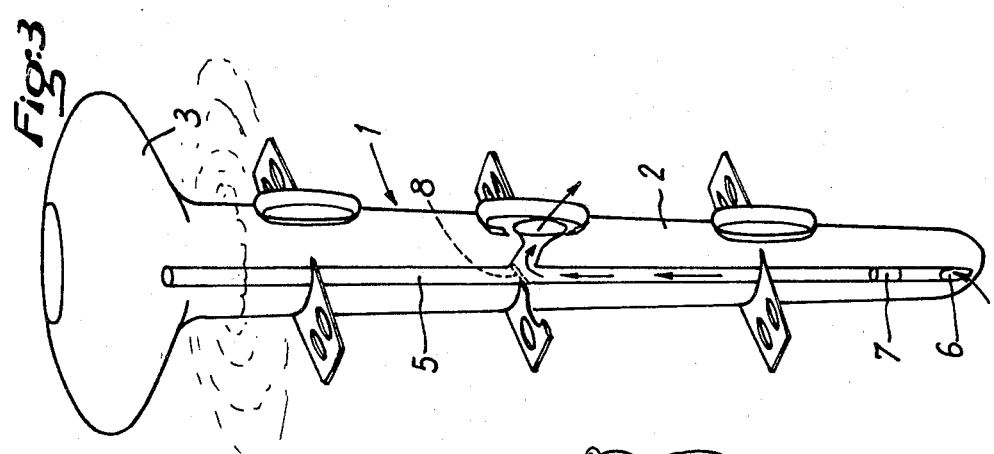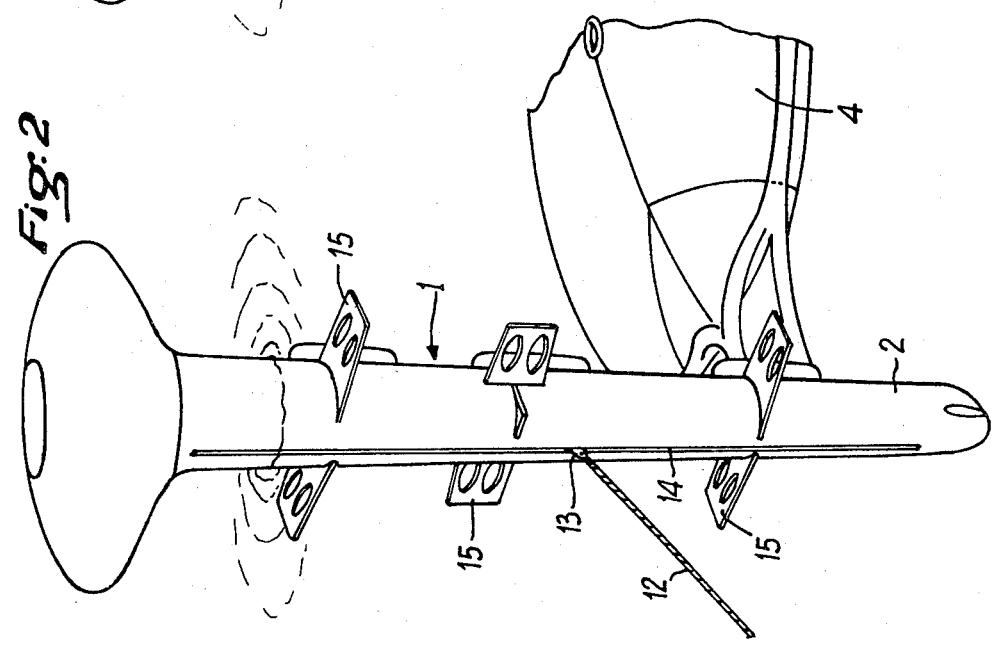

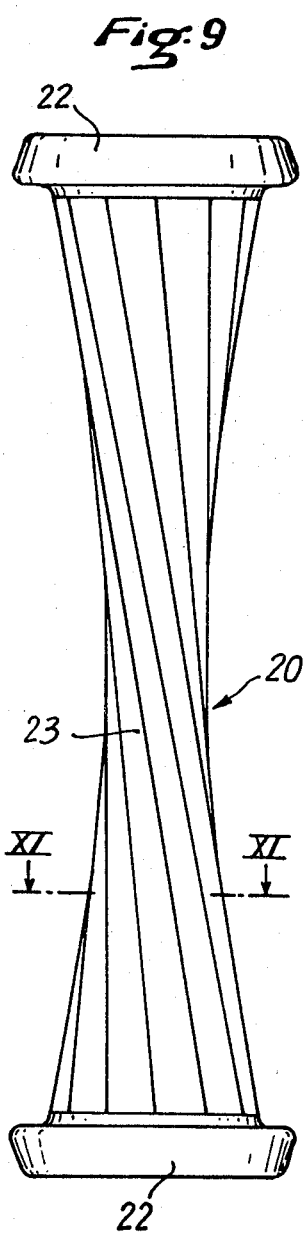
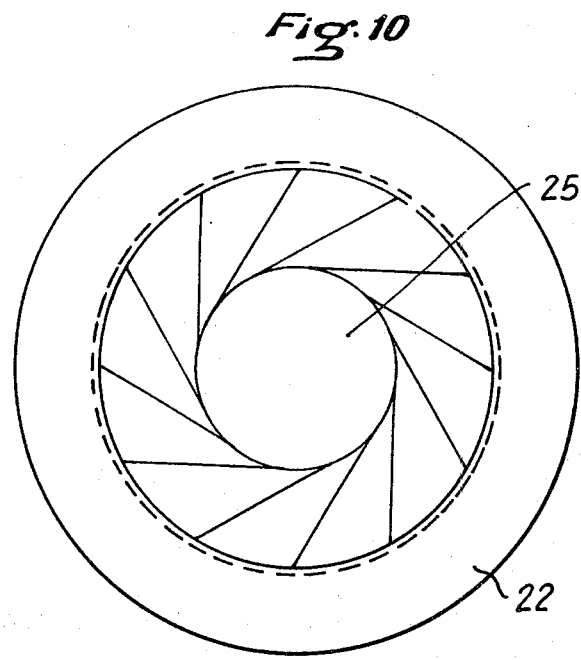
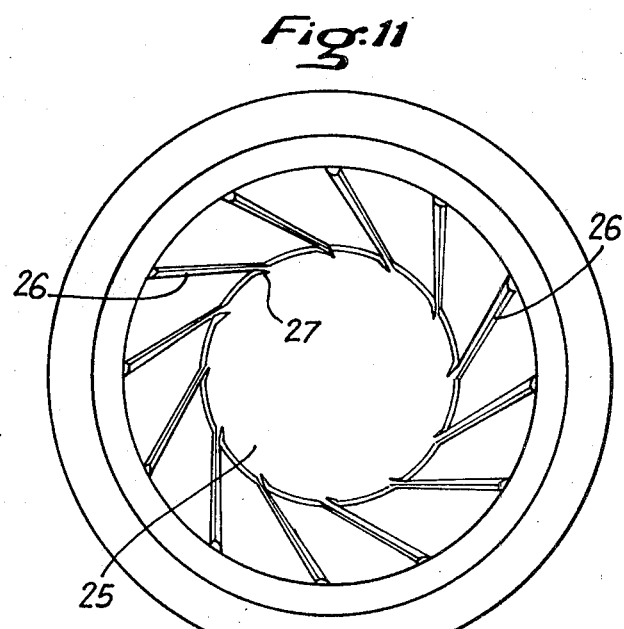

BREEDING CHAMBER FOR MARINE ANIMALS, ESPECIALLY FOR FISH, AND DEEP WATER BREEDING FARM WITH AT LEAST ONE SUCH CHAMBER

The present invention, made by Monsieur Arnaud MULLER-FEUGA, relates to a breeding chamber for marine animals, especially in open waters, and particularly for fish.

The present invention also relates to a breeding farm in deep water comprising at least one such chamber.

Considering the need for man to increase his sources of food supplies, especially for proteins, numerous attempts have been made in recent years to develop aquaculture, that is the exploitation of the aquatic environment with the aim of controlled development of a product, both animal, especially mollusks, crustaceans and fish, and vegetable, especially, algae (seaweed), and in an economically profitable manner.

Aquaculture was first set up at the interface between aquatic and terrestial property, that is along streams or waterways and along the coast or shore.

Eventually the development of floating cages and suspended breeders allowed this limited geographic domain to be extended to sheltered waters and bays.

However the operation of techniques known to date required very special condition of shelter, occupation of space, topographical profile and water quality, which significantly limits the possible sites which can be exploited.

In practice, usable sites are quite scarce because there is often territorial incompatibility between the aquatic life and the majority of coastal activities, such as industry, towns, tourism or navigation.

The present invention proposes precisely to furnish a breeding chamber and a farm comprising at least one chamber, capable of being installed at any location whatever of the marine environment and which is independent of restraints limiting the possible sites for installations known to date.

The present invention proposes also to realize a breeding farm which requires the least possible human intervention from the shore, the farm in addition, connecting to the breeding and rearing chambers, all the functions associated with this activity, especially food reserves for the fish, a self-powered energy source, and preferably a comfortable living area or habitat for a crew of operators.

The present invention has an object the new industrial product which constitutes a breeding and/or rearing chamber for raising marine animals, particularly fish, especially in open waters, comprising an inflatable structure, of a film of supple plastic material, watertight, inert with respect to the marine environment, and entirely submerged, having at least one injection opening in the structure for water under higher pressure than the surrounding environment, at least one opening or slot for evacuation or discharge, means for regulating the area of one or more evacuation openings, and at least one means for connecting the chamber to a submerged support organ.

Thus each chamber, constituted by an inflatable structure constitutes a breeding-rearing unit, continuing or bounding a certain volume of water, in which a forced circulation is insured by means of one or more injection openings for water under pressure and which flows through discharge openings, this forced circulation insuring the renewal of the water according to the needs of the animals being raised, as well as the inflation and maintaining of the shape of the chamber.

In one particular embodiment of the chamber according to the invention, the chamber has an lenticular form, made for example by joining two ovoid, spherical or ellipsoidal domes with opposite concavities, the chamber being advantageously provided with a support device constituted for example by toric collars extending around a chamber, inflated with water under high pressure made likewise of supple plastic material, watertight, and inert with respect to the marine environment, one of the toric sleeves being for example disposed in the equatorial plane of the chamber, and one or several other toric sleeves serving to join or connect the chamber with the submerged support organ, the assembly of toric sleeves being in communication with a means for inflation with high pressure water.

Preferably in this embodiment, the one or several openings for injection of high pressure water inside the structure, that is inside the volume of the chamber are made at the periphery of the chamber, particularly at the connection of the chamber with the submerged support organ where a deflector system can advantageously be placed, the one or several discharge openings being formed near the central axis of the chamber.

In a preferred embodiment the discharge near the central axis of the chamber is achieved by multiple openings or slots made in an elongated body of revolution forming a grid and axially traversing the center of the chamber, this body forming a grid communicating in addition at its extremities with the surrounding environment. This elongated body, designated by the term grid, can have a tubular cylindrical form or preferably the shape of an hyperboloid of revolution.

The means to regulate the area of the discharge openings or slots of the grid are advantageously hydraulically activated flaps, capable of being controlled at a distance from the support organ. By these means of regulating the surface of the discharge openings it is possible to keep the pressure for inflating the chamber essentially constant in spite of variations in flow of the circulation water during use. Advantageously, the inflation pressure can likewise be regulated as a function of the state of agitation of the water, to avoid deformation of the chamber under the action of pressures caused by the displacement of masses of surrounding water. It is necessary, of course, to make the discharge openings sufficiently small to prevent the passage of animals during the different stages of raising them.

According to the invention the support in the form of toric sleeves, can be provided inside or outside of the inflatable structure defining the breeding volume, it being understood that the assembly constituted by the inflatable structure, the toric support sleeves and the central grid, must have essentially no floatability, that is that the supple plastic materials used must have a density essentially equal to that of the water, the grid, preferably metallic, must comprise means to compensate for its floatability.

The present invention likewise relates, by virtue of a new industrial product, to a breeding farm for marine animals, especially in open waters and particularly for fish, comprising at least one chamber as described above, and preferably multiple chambers staged along the submerged part of a support organ such as a floating spar-buoy, for example, of the type called "perche de Froude", said spar-buoy comprising, preferably at its lower part, pumping means, for example in the form of low pressure helical or propeller pumps, capable of drawing in water from the surrounding medium at the lower part of the spar-buoy and delivering it into each of the chambers with the overpressure required to insure the inflation of the chambers. The filling and the pressurizing of the toric sleeves of the support device associated with this chamber are assured by separate pumping means.

The spar-buoy comprises advantageously an anchoring device comprising preferably an unique anchor line capable of being joined by one of its extremities to the sea bottom, the other extremity being provided with an organ capable of sliding along a guide rail provided along the length of the spar-buoy.

It has been ascertained in a remarkable and surprising manner that one spar-buoy furnished with multiple chambers staged over the length of its submerged part, presents a very great stability in the most diverse swell conditions, and especially a remarkable stability to rolling, to pounding and to damage by swells or waves.

This stability to pounding in particular, can produce stresses at the connections with the chambers, especially those which are the highest in position, because of the significant relative vertical movements of the chambers with respect to the spar. These relative vertical movements, and thus these stresses, can be lessened by placement at levels corresponding to each chamber, of flaps which pivot between a horizontal position and a vertical position.

In addition to certain standard equipment such as water and weight, ballast, anchor winches, etc. . . . , the spar-buoy advantageously has in its own vertical body, one or more reservoirs for storing food for the animals during raising, and in its upper above water part, a habitat for operating personnel.

Other advantages and characteristics of the invention will be apparent from the following description given as a non-limiting example of one embodiment of a chamber and of a breeding farm according to the present invention.

In the drawings:

FIGS. 2, 3 and 4 show the farm of FIG. 1, in use, with some or all of the breeding chambers omitted for greater clarity;

FIG. 9 is a view in elevation of the central grid usable in the chamber of FIGS. 5 to 8;

FIG. 10 is a plan view of the grid of FIG. 9;

FIG. 11 is a sectional view along line XI—XI of FIG. 9;

Figure 12:
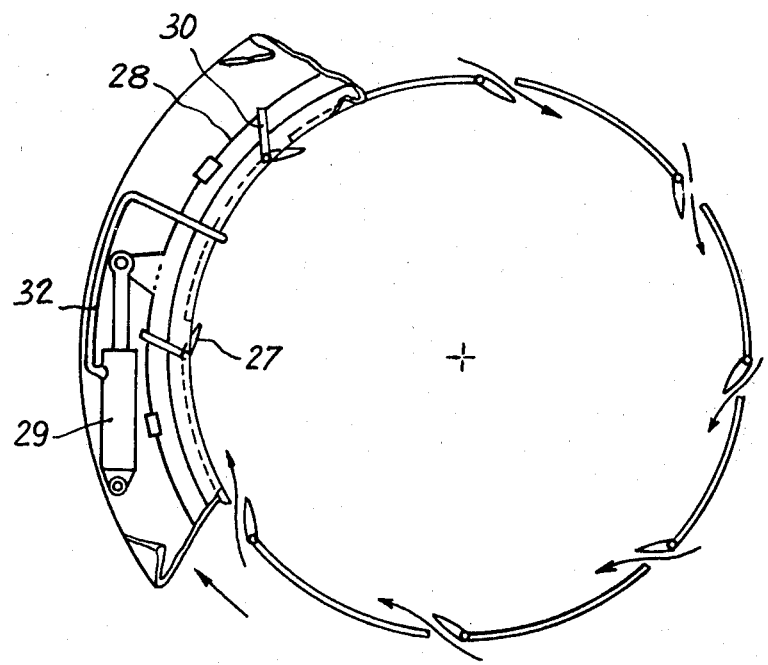

and FIG. 12 shows a partial view of the mechanism to regulate the evacuation surface of the grid of FIGS. 9 to 11.

First refer to FIGS. 1 through 4 which show a breeding farm according to the present invention.

In the embodiment shown, the breeding farm according to the invention comprises a floating spar-buoy of the "Froude spar" type comprising an essentially tubular vertical body 2, partially submerged, and an upper part 3 of greater diameter and totally above water.

In this upper part 3 is the habitat for the operating crew, means for control and for measurement of the breeding conditions, and means to furnish to the farm the energy necessary for its functioning. In order to give it an autonomous energy supply, these former means can be for example captors of solar energy, windmill energy (wind power), wave or swell energy and/or water current energy.

Along the vertical body 2 of the spar-buoy 1 are multiple breeding chambers 4 which will be described in more detail by referring to FIGS. 5 to 8.

Each of the chambers 4, as can be seen from FIGS. 3 and 4 can be put in communication with longitudinal conduits 5, each corresponding to a chamber, situated in the spar-buoy 1, and which communicate at their lower part at 6 with the surrounding medium. Pumping means, schematically shown by 7 in FIGS. 3 and 4, in the form for example of low pressure helical or turbine pumps, are positioned at the lower part of each conduit 5. These pumping means 7 as is schematically shown by the arrows in FIG. 3, circulate the water drawn in at inlet 6 at the lower part of the spar-buoy 1 through the corresponding conduit 5 with a desired overpressure to the corresponding chamber, by activating a flap valve 8 disposed in each conduit 5 at the level of the corresponding chamber.

FIG. 4 shows schematically how the emptying of a chamber of animals would take place, especially fish which have been raised in it.

The spar-buoy is unballasted until a sorting tank 9, situated in its upper part 3, is placed in water. This sorting tank 9 comprises a drain pump shown schematically at 11 which draws out the water contained in the chamber after pivoting flap valve 8, through conduit 5 and the sorting tank 9. The volume of the chamber being reduced, the animals try to escape through conduit 5 and rise into the sorting tank 9 where they can be recovered or measured.

To introduce the animals into a chamber, they are redelivered into the conduit 5 corresponding to the chamber, from the surface to the level of the flap valve 8, where they are taken in charge by the circulation current caused by the activation of the pumping means 7 at the lower part of the spar-buoy 1.

The advance of nourishment or food toward a chamber is carried out likewise by means of the circulation current caused by the activation of the pumping means 7, a circulation current in which the successive food rations are introduced from the surface by means of a flow of water to the region between the flap valve 8 and the connection zone of the chamber to the spar.

As can be seen in FIG. 2 the spar-buoy 1 is moored by means of an anchor line 12 joined to a slide 13 capable of being displaced along the spar buoy 1 on a guide rail 14.

Along the submerged part of the vertical body 2 of the spar-buoy 1 are pivoting flaps 15 capable of assuming different positions as can be seen in FIG. 2.

Refer now more particularly to FIGS. 5 through 8 which shows an embodiment of a chamber according to the invention.

The chamber according to the invention is constituted by a water inflatable structure of lenticular form 16, this inflatable structure being made of any supple watertight material, inert in relation to the influences of the marine environment, and of a density essentially equal to that of the water.

In the embodiment shown there is provided in addition, supports constituted of multiple toric sleeves 17 likewise made of any supple watertight material, inert with respect to the influences of the marine environment and having a density essentially equal to that of the water. As can be seen in the drawings, one of these toric sleeves 17 encircles the inflatable structure 16 near its equatorial plane thus forming a rim.

Figure 7:
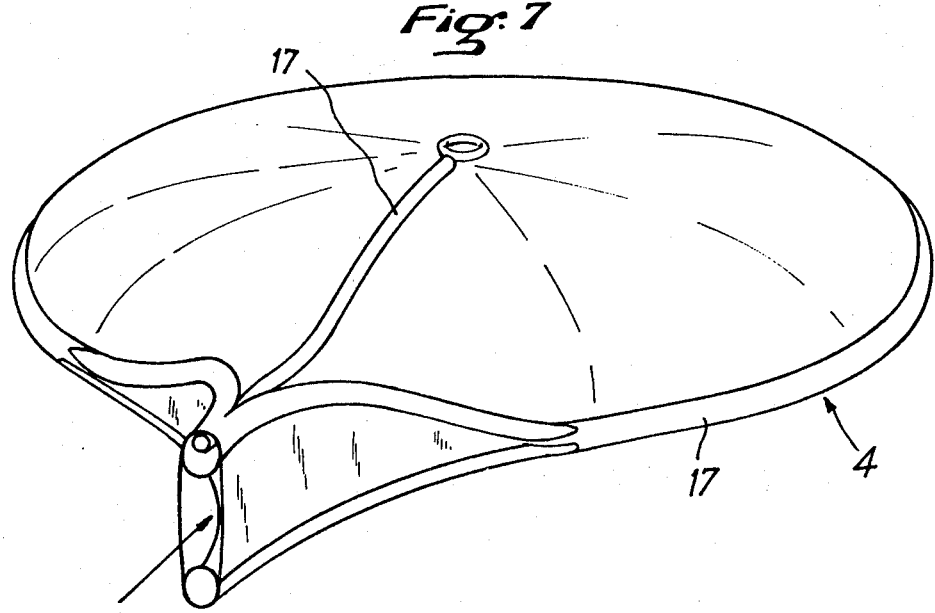
FIG. 7 shows the chamber of FIGS. 5 and 6 in perspective.
Figure 8:
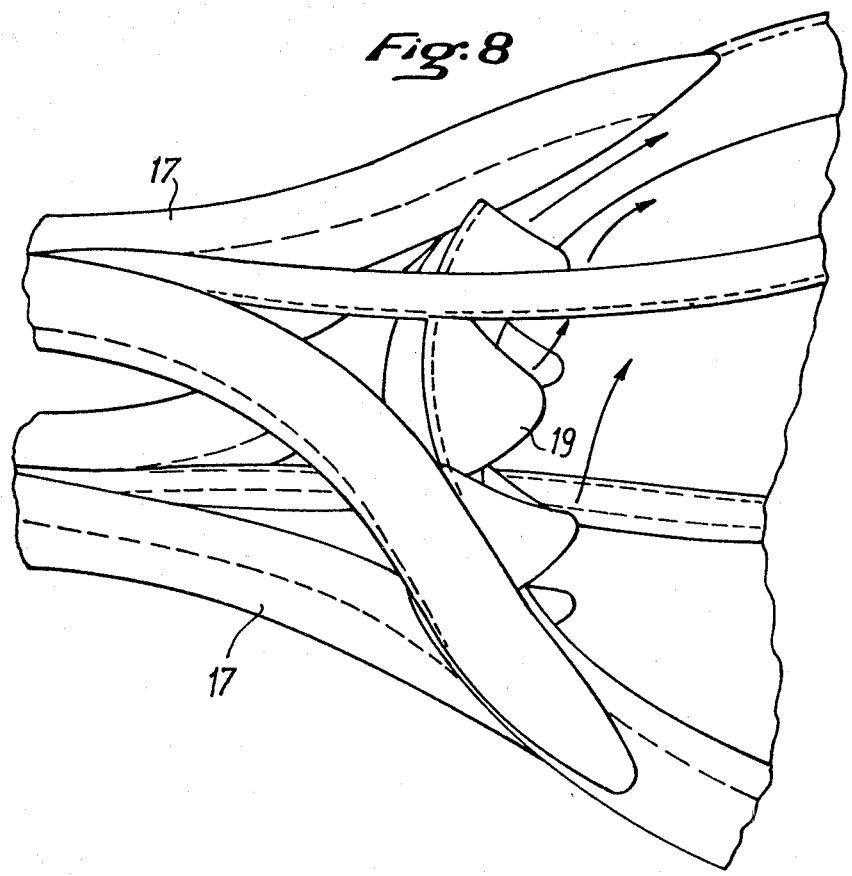
FIG. 8 is an enlarged view showing the region of connection of the chamber to its support organ and the toric support sleeves, and the inlet deflector system for water under pressure.

As is schematically shown in FIG. 7 the toric sleeves 17 are in communication with the spar-buoy 1 in such a way as to be inflated with water under high pressure necessary to insure their rigidity. Separate pumps can be used to inflate toric sleeves 17.

The inside of the inflatable structure 16 is likewise in communication with the spar-buoy 1 to receive water at a pressure greater than the surrounding environment, this water being directed tangentially at the periphery of the inflatable structure by a deflector system 19. The mass of water contained in the inflatable structure and which contains the animals thus has a rotational component to renew the water in the chamber.

Near its central axis the inflatable structure 16 is traversed by a grid 20 which will be described in more detail by referring to FIGS. 9 through 11.

Figure 1:
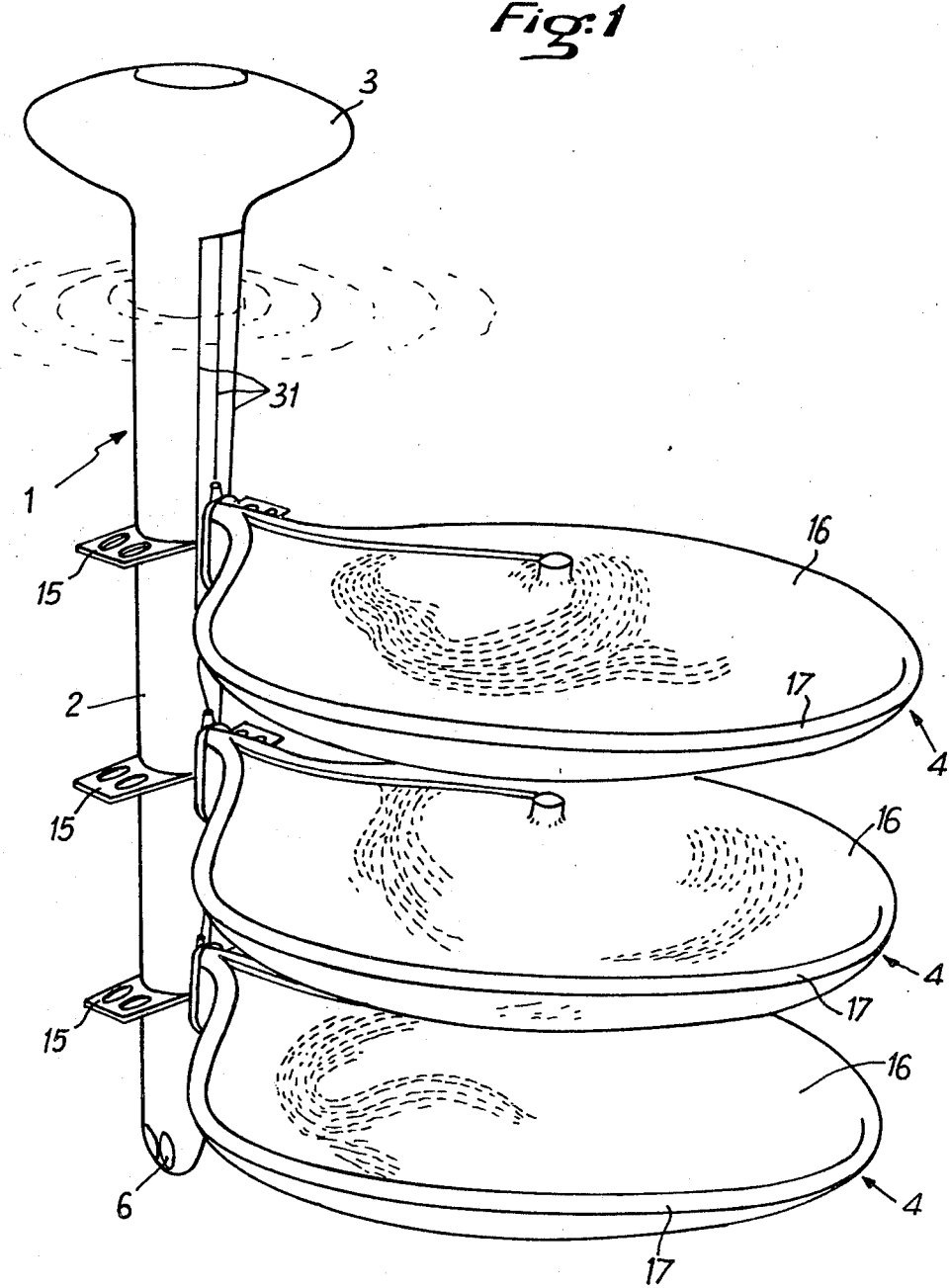
FIG. 1 is a perspective view of the assembly of a farm according to the invention.
Figure 5:
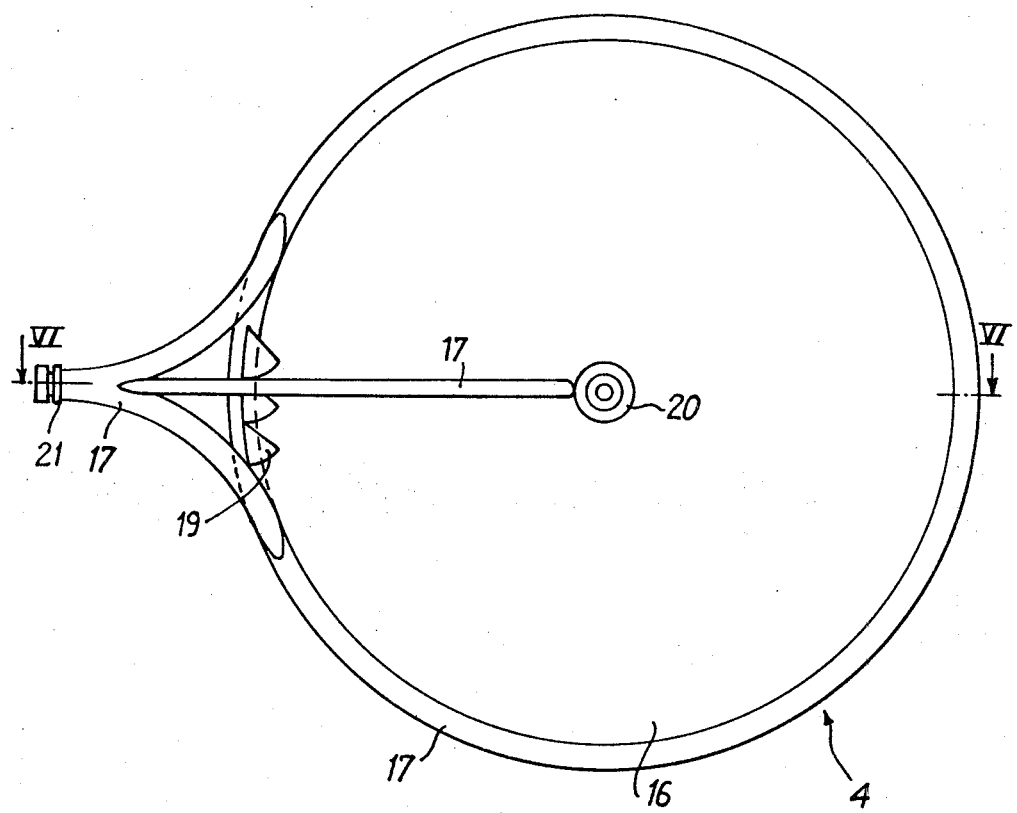
FIG. 5 is a plan view of one breeding chamber according to the invention.
Figure 6:
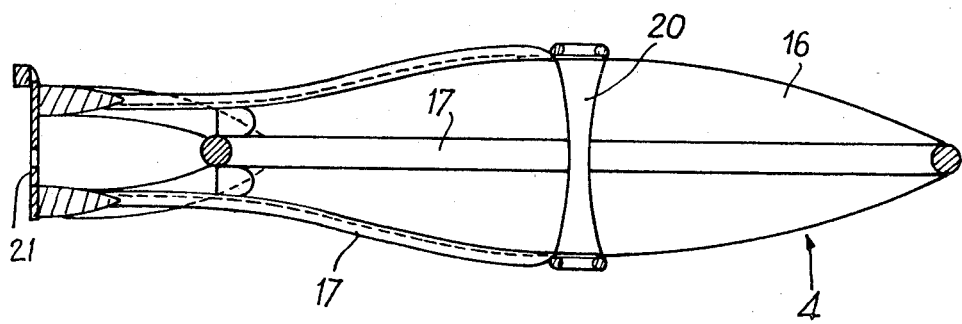
FIG. 6 is a sectional view taken along line VI—VI of FIG. 5.

There is also provided, means to fasten each of the chambers 4 onto the spar-buoy 1, and in the form of an inflatable joint locking a plate 21 into a fitting fixed to the spar-buoy. Plate 21 has fastened to it the extremities of the toric sleeves and the inflatable structure and is positioned in its seat or fitting by sliding it along a guide 31 along the length of the spar-buoy (FIG. 1). The inflatable joint cooperates with plate 21 to insure a perfect joining of each of the chambers 4 with the spar-buoy 1 and, especially, to insure that the watertight connections between the conduits under pressure of the spar-buoy and those corresponding to the chambers be established, conduits which supply the hydraulic control at a distance from the opening of the grid 20, the toric sustaining sleeves and the water circulation injection system.

Although FIGS. 5 through 8 show the support in the form of toric sleeves disposed inside the inflatable chamber 16, it is of course understood that the invention is not limited to this embodiment and that the support sleeves can be outside the inflatable structure.

FIGS. 9 through 11 show an embodiment of a central grid 20 for a chamber according to the invention.

As can be seen in FIG. 9 this grid 20 has two annular end member 22 and a central zone 23 in the shape of a hyperboloid of revolution. Ends 22 contain a mechanical means (FIG. 11) for regulating the discharge area of grid 20, and also contain an incompressible material of low density such as oil, to annul the negative floatability of grid 20.

As can be seen in FIG. 11, the communication between the interior 25 of the grid and its exterior, that is, the medium contained in inflatable structure 16 is assured by multiple slots or windows 26 each provided with a door or flap 27 at its inner opening.

As can be seen in FIG. 12, there is a mechanism for regulating the area of the inner openings of slots 26 by activating flaps 27.

This mechanism can be for example a sluicegate, analogous to that used for example in the Francis turbines and which comprises a circular operator 28 which can be activated by an hydraulic jack 29 supplied by a control conduit 32 to vary, with links 30, the inclination of flaps 27.

Although the invention has been described by means of preferred embodiments it is obvious that it is in no way limited and that it can be modified in numerous ways without going beyond the framework or the intent of the invention.

What is claimed is:

1. A chamber for rearing marine animals in open waters comprising, a watertight water inflatable structure of flexible plastic material wholly submerged in the water, said plastic material being inert with respect to a marine environment, means for injecting water at a pressure greater than the surrounding environment into said structure to maintain the structure inflated with water, means for discharging water from the structure, said injecting means and discharge means causing a forced circulation of water through the structure, and means for connecting said chamber to a submerged support organ.

2. A chamber according to claim 1 wherein said means for discharging water from said chamber comprises a plurality of discharge openings, and remotely controlled means for varying the area of said openings.

3. A chamber according to claim 1 wherein, said chamber comprises a chamber of lenticular form, and means for supporting said chamber.

4. A chamber according to claim 3 wherein said means for supporting said chamber comprises a toric sleeve of a flexible watertight plastic material and inert in the marine environment, at least one such sleeve connecting a chamber with said submerged support organ, and means for inflating said sleeves with pressurized water.

5. A chamber according to claim 3 wherein each lenticular chamber comprises opposed generally dome shaped portions of said plastic material of a pre-determined geometrical configuration.

6. A chamber according to claim 3 wherein said chamber support means is disposed outside the inflatable chamber.

7. A chamber according to claim 3 wherein said chamber support means is positioned inside the inflatable chamber structure.

8. A chamber according to claim 1 wherein said means for injecting water at a greater pressure than the surrounding environment includes, means defining water inlet openings near the periphery of the chamber, and said means for discharging water comprising means defining discharge openings near a central axis of the chamber.

9. A chamber according to claim 8 further comprising deflector means for directing water tangentially along the inner periphery of the inflatable structure.

10. A chamber according to claim 8 wherein said chamber further comprises an elongated body of revolution axially traversing the center of the chamber, said body having its ends communicating with the surrounding environment, said discharge openings comprising multiple openings in said elongated body communicating between said chamber and the ends of said body.

11. A chamber according to claim 10 wherein said elongated body has the form of a hyperboloid of revolution.

12. A chamber according to claim 1 comprising at least one chamber of a farm for growing marine animals.

13. A farm according to claim 12 comprising a plurality of said chambers in spaced apart relation along a submerged portion of the support organ, said support organ comprising a submerged part of a spar-buoy, and said means for injecting water comprises pumping means near the lower portion of said spar-buoy.

14. A farm according to claim 12 further comprising means for anchoring said support organ and including at least one anchor line connectable to the sea floor, and means for connecting the line to a rail extending longitudinally of the support organ.

15. A farm according to claim 13 further comprising wave resisting pivotable flaps along a submerged portion of the spar-buoy.

* * * * *